United States Patent
Berruet et al.

(10) Patent No.: US 9,772,022 B2
(45) Date of Patent: Sep. 26, 2017

(54) MECHANICAL SYSTEM, INJECTION PUMP AND VALVE ACTUATOR COMPRISING SUCH A MECHANICAL SYSTEM AND MANUFACTURING METHOD

(71) Applicants: Nicolas Berruet, Artannes sur Indre (FR); Charles Chambonneau, Joué lès Tours (FR); François Champalou, Chaumont-sur-Loire (FR); Benoît Hauvespre, Saint Etienne de Chigny (FR); Samuel Viault, Saint-Antoine-du-Rocher (FR)

(72) Inventors: Nicolas Berruet, Artannes sur Indre (FR); Charles Chambonneau, Joué lès Tours (FR); François Champalou, Chaumont-sur-Loire (FR); Benoît Hauvespre, Saint Etienne de Chigny (FR); Samuel Viault, Saint-Antoine-du-Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 65 days.

(21) Appl. No.: 14/499,580

(22) Filed: Sep. 29, 2014

(65) Prior Publication Data
US 2015/0096515 A1 Apr. 9, 2015

(30) Foreign Application Priority Data
Sep. 27, 2013 (EP) ..................................... 13186501

(51) Int. Cl.
*F01L 1/14* (2006.01)
*F16H 53/06* (2006.01)
(Continued)

(52) U.S. Cl.
CPC ................ *F16H 53/06* (2013.01); *F01L 1/14* (2013.01); *F01L 1/143* (2013.01); *F02M 37/06* (2013.01);
(Continued)

(58) Field of Classification Search
CPC .. F16H 53/06; F01L 1/14; F01L 1/143; F02M 37/06; F02M 59/102; F02M 59/48;
(Continued)

(56) References Cited

U.S. PATENT DOCUMENTS

| 5,127,374 A * | 7/1992 | Morel et al. ................ 123/90.35 |
| 6,688,269 B1 | 2/2004 | Steinmetz |

(Continued)

FOREIGN PATENT DOCUMENTS

| DE | 2361679 A1 | 6/1974 |
| DE | 3247026 A1 | 6/1984 |

(Continued)

*Primary Examiner* — Zelalem Eshete
(74) *Attorney, Agent, or Firm* — Bryan Peckjian; SKF USA Inc. Patent Dept.

(57) ABSTRACT

A mechanical system, comprising a support element, a pin extending along a first axis and comprising two opposite ends, each adapted to be fitted in the support element for radial retention of the pin relative to the first axis, and a roller element movable in rotation relative to the pin around the first axis. The mechanical system includes two ribs resting on either side of the ends for axial retention of the pin along the first axis. The mechanical system can be integrated into either an injection pump or a valve actuator.

16 Claims, 3 Drawing Sheets

(51) Int. Cl.
  *F02M 59/10*   (2006.01)
  *F02M 59/48*   (2006.01)
  *F04B 1/04*    (2006.01)
  *F02M 37/06*   (2006.01)

(52) U.S. Cl.
  CPC .......... *F02M 59/102* (2013.01); *F02M 59/48* (2013.01); *F04B 1/0408* (2013.01); *F04B 1/0426* (2013.01); *F01L 2105/02* (2013.01); *F02M 2200/852* (2013.01); *F02M 2200/9015* (2013.01); *Y10T 29/49826* (2015.01); *Y10T 74/2107* (2015.01)

(58) Field of Classification Search
  CPC ...... F02M 2200/852; F02M 2200/9015; F04B 1/0408; F04B 1/0426; Y10T 29/49826; Y10T 74/2107
  See application file for complete search history.

(56) References Cited

U.S. PATENT DOCUMENTS

| | | | |
|---|---|---|---|
| 8,181,616 B2 * | 5/2012 | Sailer et al. | 123/90.5 |
| 2013/0213333 A1 * | 8/2013 | Dorn | F01L 1/14 123/90.48 |

FOREIGN PATENT DOCUMENTS

| | | |
|---|---|---|
| DE | 102006028348 B3 | 10/2007 |
| DE | 102007006320 A1 | 8/2008 |
| EP | 2607636 A1 | 6/2013 |
| GB | 1429146 A | 3/1976 |
| WO | 0161179 A2 | 8/2001 |

\* cited by examiner

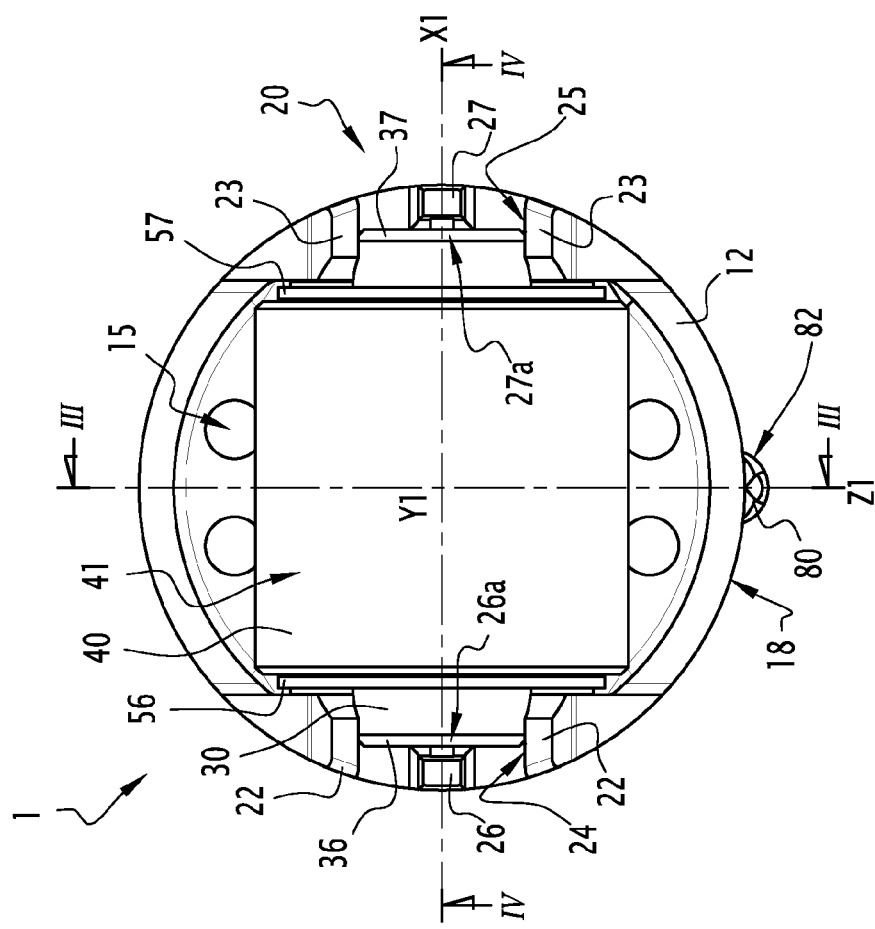
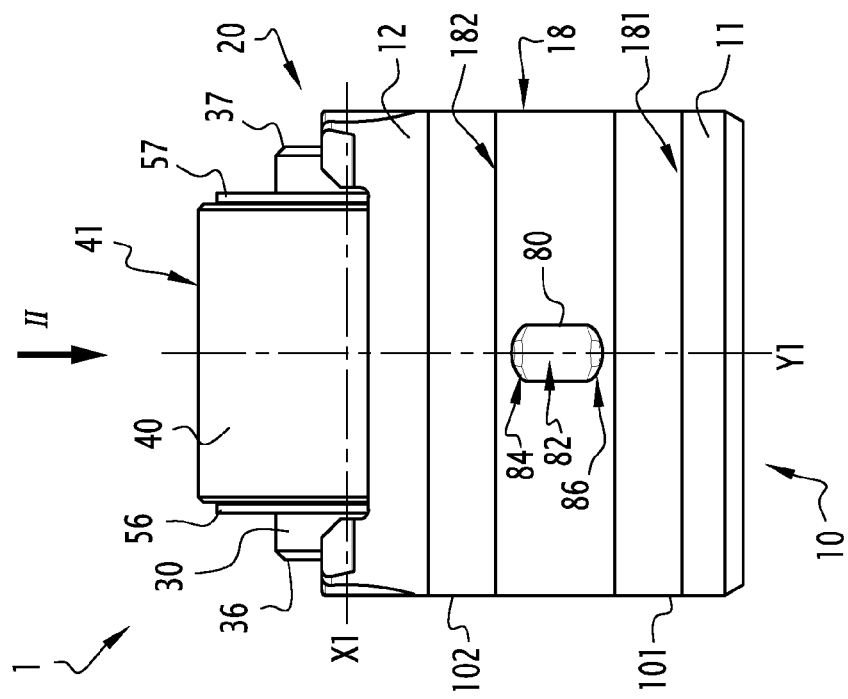

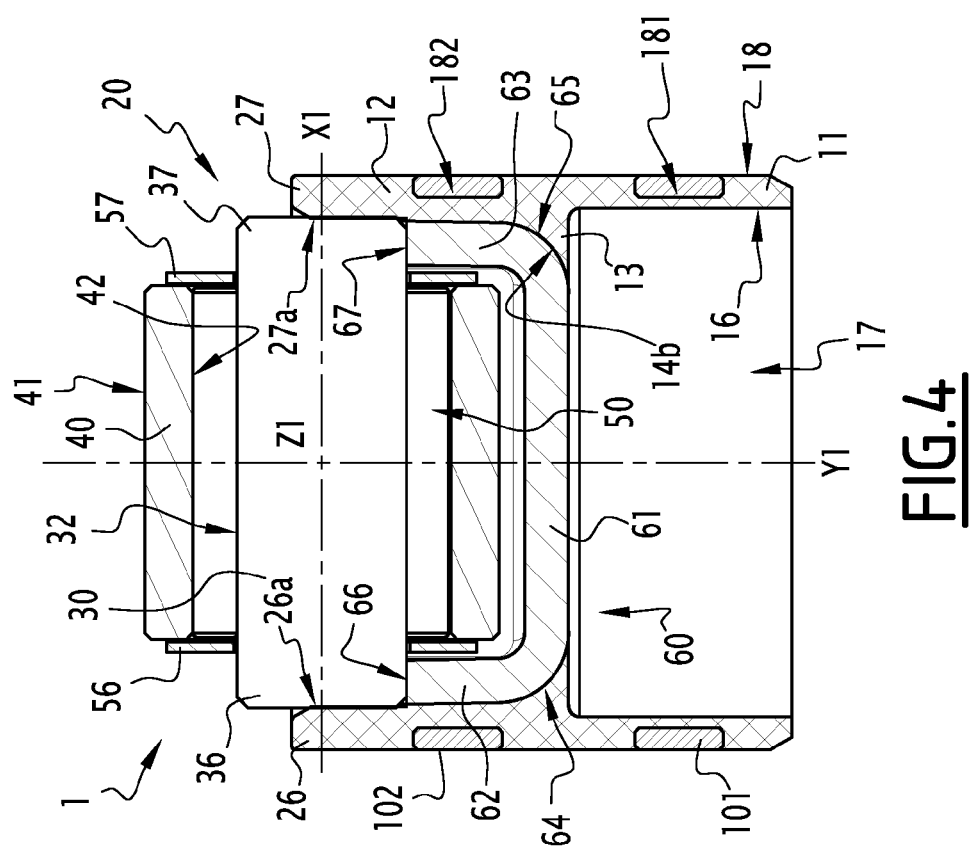
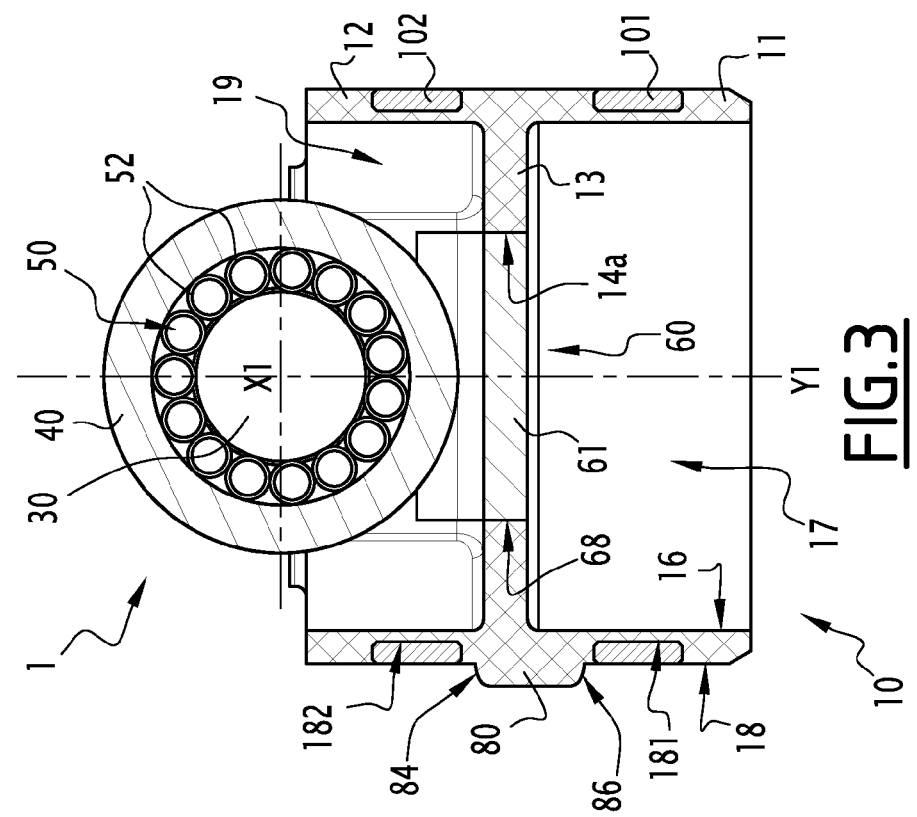

MECHANICAL SYSTEM, INJECTION PUMP AND VALVE ACTUATOR COMPRISING SUCH A MECHANICAL SYSTEM AND MANUFACTURING METHOD

CROSS REFERENCE TO RELATED APPLICATION

This is a National Stage application claiming the benefit of European Union Patent Application Number 13186501.6 filed on 27 Sep. 2013, which is incorporated herein by reference in its entirety.

TECHNICAL FIELD OF THE INVENTION

The invention concerns a mechanical system. The invention also concerns an injection pump and a valve actuator for a motor vehicle, by example for a diesel truck or gasoline car engine, each comprising such a mechanical system. The invention also concerns a method for manufacturing such a mechanical system.

BACKGROUND OF THE INVENTION

Classically, a cam follower belonging to an injection pump comprises a tappet, a roller and a pin. The roller and the pin are centered on a transverse axis, while the tappet extends along a longitudinal axis. The pin is fixed to the tappet, while the roller is movable in rotation relative to the pin around its axis. When the cam follower is in service, the roller collaborates with a cam synchronized with the internal combustion engine camshaft. The rotation of the camshaft leads to a periodic displacement of a piston of the pump that rests against the tappet, to allow fuel to be delivered. The tappet is movable back and forth along the longitudinal axis.

It is known to ensure the retention of the pin relative to the tappet by caulking, press-fitting, clipping or using a circlip, in particular depending on configuration and material of the tappet.

EP-A-2 607 636 describes a cam follower comprising a tappet formed with two lateral flanges, delimiting an intermediate gap between them and each comprising a cylindrical bore. The roller is positioned in the intermediate gap, between both flanges and bores. The pin is then caulked, in other words plastically deformed, on both opposite ends to create a mechanical connection by press-fit in the tappet bores.

U.S. Pat. No. 6,688,269 describes a cam follower with a tappet comprising two pairs of tabs, which are elastically deformable and into which the pin is clipped.

SUMMARY OF THE INVENTION

The aim of the invention is to provide an improved mechanical system, such as a cam follower or a rocker arm.

To this end, the invention concerns a mechanical system, comprising a support element, a pin extending along a first axis and comprising two opposite ends, each adapted to be fitted in the support element for radial retention of the pin relative to the first axis, and a roller element movable in rotation relative to the pin around the first axis.

According to the invention, the mechanical system comprises two ribs resting on either side of the ends for axial retention of the pin along the first axis.

Thanks to the invention, the retention of the pin relative to the support element, which is for example the tappet of a cam follower, is ensured without using a caulking process.

The two opposed ribs provide an axial retention of the pin in addition to the radial retention provided by the pairs of tabs. In comparison with caulking, design of the mechanical system and its assembly are simplified. The support element can be manufactured in synthetic material, such that weight and cost of the system are reduced.

According to further aspects of the invention which are advantageous but not compulsory, such a mechanical system may incorporate one or several of the following features:

The two ribs are integrally formed with the support element.
 The support element comprises two pairs of tabs into which the two opposite ends are clipped for radial retention of the pin relative to the first axis.
 The two pairs of tabs are integrally formed with the support element.
 The support element comprises two bearing sections receiving at least partially both ends of the pin.
 Each rib includes a stub protruding toward the other stub along the first axis, while each end of the pin includes a recess for receiving one of the stubs, for radial retention of the pin relative to the first axis.
 The support element is overmolded onto an insert receiving at least partially both ends of the pin.
 The mechanical system comprises at least one antirotation device integrally formed with the support element.
 The mechanical system comprises a rolling bearing including rolls or needles or a bushing positioned between the pin and the roller element; and lateral flanges for axial retention of the rolls or needles or of the bushing along the first axis.
 The support element is made of synthetic material, for example of polyamide or polyether-ether-ketone.
 The mechanical system constitutes a cam follower, wherein the support element is a tappet movable along a translation axis perpendicular to the first axis and wherein the roller element is adapted to roll on an outer surface of a cam.
 The mechanical system constitutes a rocker arm, wherein the roller element is secured to an arm and a tappet, possibly acting on a valve stem.

The invention also concerns an injection pump for a motor vehicle, equipped with a mechanical system as mentioned here-above.

The invention also concerns a valve actuator for a motor vehicle, equipped with a mechanical system as mentioned here-above.

The invention also concerns a method for manufacturing a mechanical system as mentioned here-above, wherein the pin is clipped into the pairs of tabs and between the two ribs.

BRIEF DESCRIPTION OF THE DRAWINGS

The invention will now be explained in correspondence with the annexed figures, as an illustrative example, without restricting the object of the invention. In the annexed figures:

FIG. 1 is a side view of a mechanical system according to the invention, of the cam follower type, comprising a tappet, a pin and a roller;

FIG. 2 is a top view, along arrow II of FIG. 1;

FIG. 3 is a sectional view along line of FIG. 2;

FIG. 4 is a sectional view along line IV-IV of FIG. 2;

DETAILED DESCRIPTION OF SOME EMBODIMENTS

Figure 5:
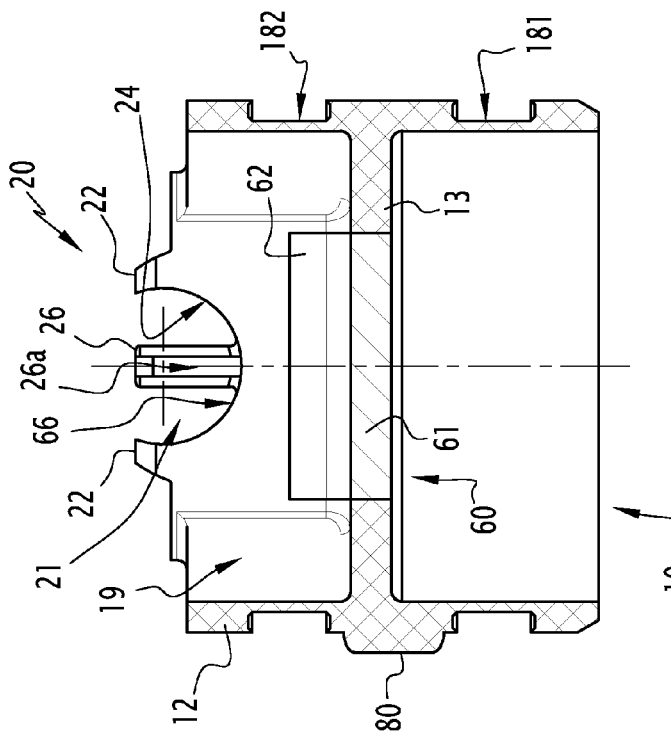
FIG. 5 is a perspective view showing the tappet belonging to the mechanical system of FIGS. 1 to 4.

The mechanical system 1 represented on FIGS. 1 to 6 is of the cam follower type, adapted to equip an injection pump for a motor vehicle, preferably for a gasoline car engine, not shown.

The system 1 comprises a tappet 10, a pin 30, a roller 40, a rolling bearing 50 and an insert 60. Pin 30, roller 40 and bearing 50 are centered on a transverse axis X1, while tappet 10 is centered on a longitudinal axis Y1. Axis X1 and Y1 are perpendicular.

As shown on FIGS. 3 and 4, the tappet 10 comprises a first cylindrical portion 11, a second cylindrical portion 12 and a central radial portion 13 interposed between portions 11 and 12. Tappet 10 also comprises a bearing portion 20 extending from portion 12 opposite portions 11 and 13. Cylindrical portion 11 has a cylindrical inner bore 16 delimiting a cavity 17 inside tappet 10. This cavity 17 is adapted to receive a shaft, not shown, for moving tappet 10 along axis Y1. Cylindrical portion 12 delimits another cavity 19 inside tappet 10, partly receiving pin 30, roller 40 and bearing 50. Portion 13 comprises plane surfaces 14a and curved surfaces 14b surrounding insert 60. Four holes 15 extend through portion 13 parallel to axis Y1, connecting cavities 17 and 19, to allow a flow of lubricant therebetween. Tappet 10 has a cylindrical outer surface 18, with a circular basis, centered on axis Y1 and extending along both portions 11 and 12.

Tappet 10 is movable back and forth along axis Y1, in a non-represented bore belonging to the injection pump, with surface 18 sliding in this bore. Tappet 10 can be made of synthetic material, by example polyamide 6,6 (PA) or polyether-ether-ketone (PEEK), or made of metal, by example steel. Material of the tappet 10 is chosen resistant to oil flow and temperature variations.

Furthermore, tappet 10 forms a support element for pin 30, roller 40 and bearing 50. More precisely, bearing portion 20 of tappet 10 is adapted to receive pin 30, on which roller 40 and bearing 50 are mounted. To this end, bearing portion 20 comprises two pairs of stops or tabs 22 and 23 extending from portion 12 in a bifurcated manner, on both side of axis Y1. Each of the tabs 22 and 23 is elastically deformable. Pair of tabs 22 is projected substantially in a first plane parallel to axis Y1, while pair of tabs 23 is projected substantially in a second plane parallel to axis Y1. The pairs of tabs 22 and 23 delimit between them an intermediate gap 21 joining cavity 19. The pairs of tabs 22 and 23 are adapted to receive pin 30 clipped into them. The pairs of tabs 22 and 23 provide radial retention of pin 30 relative to axis X1.

On the bearing portion 20, each pair of tabs 22 and 23 delimits a partial cylindrical bore, respectively 24 and 25. Partial bores 24 and 25 are preferably machined. Partial bores 24 and 25 are centered on axis X1 and have the same diameter. Partial bores 24 and 25 form bearing sections receiving pin 30 in bearing contact radially to axis X1, particularly along a direction parallel to axis Z1.

According to the invention, bearing portion 20 of tappet 10 is also provided with two opposed ribs 26 and 27 for axial retention of pin 30. Ribs 26 and 27 extend from portion 12 parallel to axis Y1 and perpendicular to axis X1. Rib 26 is located between tabs 22, while rib 27 is located between tabs 23, on respective side of axis Y1. Each of the ribs 26 and 27 is elastically deformable. Together with the pairs of tabs 22 and 23 and the partial bores 24 and 25, the ribs 26 and 27 delimit the intermediate gap 21 receiving pin 30. The ribs 26 and 27 have inner faces, respectively 26a and 27a, resting on either side of the pin 30 along the first axis X1. The ribs 26 and 27 provide axial retention of pin 30 relative to axis X1.

In practice, bearing portion 20 may have different configurations without leaving the scope of the invention. Tabs 22 and 23 and ribs 26 and 27 are designed with a mechanical resistance sufficient when system 1 is in service. Preferably, tabs 22 and 23 and ribs 26 and 27 are integrally formed with tappet 10.

Pin 30 comprises a cylindrical surface 32 extending between two pin ends 36 and 37. In practice, pin ends 36 and 37 are adapted to be fitted in the bearing portion 20. More precisely, pin ends 36 and 37 are adapted to be clipped into the pairs of tabs 22 and 23 and between the ribs 26 and 27. Then, pin ends 36 and 37 are in contact with partial bores 24 and 25 and with faces 26a and 27a. Pin 30 is made of metal, such as steel or bronze.

Roller 40 has an outer cylindrical surface 41 and an inner cylindrical bore 42 centered on axis X1. Surface 41 is intended to bear against an outer surface of a non-represented cam, synchronized with the internal combustion engine camshaft.

Rolling bearing 50 comprises a series of rolls 52 extending parallel to axis X1 and distributed regularly around axis X1. Rolls 52 are interposed between surface 32 of pin 30 and surface 42 of roller 40. Alternatively, elements 52 may be needles, in this case bearing 50 is a needle bearing. Moreover, system 1 comprises lateral flanges 56 and 57 for axial retention of the rolls or needles 52 along axis X1.

As shown on FIGS. 3 and 4, insert 60 is preferably made of stamped metal sheet and assembled with tappet 10 by overmolding. Insert 60 comprises a plane central portion 61 and two plane lateral portions 62 and 63. Insert 60 comprises a curved portion 64 connecting portions 61 and 62 and a curved portion 65 connecting portions 61 and 63. Curved portions 64 and 65 are in contact with curved surfaces 14b of central portion 13. Insert 60 comprises a half-cylindrical section 66 supporting end 36 of pin 30 together with bore 24. Insert 60 comprises a half-cylindrical section 67 supporting end 37 of pin 30 together with bore 25. Central portion 61 comprises lateral plane surfaces 68 in contact with plane surfaces 14a of central portion 13.

When mechanical system 1 is mounted, pin 30, roller 40 and rolling bearing 50 are inserted in the intermediate gap 21. Pin ends 36 and 37 are clipped into the pairs of tabs 22 and 23, in bearing contact against bores 24 and 25 and sections 66 and 67. At this stage, roller 40 is movable in rotation relative to pin 30 around axis X1. Pin axis, roller axis and rolling bearing axis merge with axis X1. Roller 40 is then adapted to roll, more precisely its surface 41 can roll, on an outer surface of the non-represented cam. The load applied on surface 41 of roller 40 is transmitted to rolling bearing 50, then to pin 30, then to insert 60 and tappet 10. Insert 60 is more resistant than bearing portion 20 to load transmitted from roller 40, in other words insert 60 increases mechanical resistance of system 1.

Besides, system 1 comprises an antirotation device 80 integrally formed with tappet 10, on its outer surface 18. Device 80 is a pin protruding from surface 18 along a direction parallel to an axis Z1 perpendicular to axes X1 and Y1. Pin 80 has an outer surface 82 having a rounded shape in a sectional plane perpendicular to axis Y1, as shown on FIG. 2. Surface 82 cooperates with a non-represented guiding groove, formed in the bore surrounding the tappet. Thus, pin 80 prevents tappet 10 from rotating in this bore around axis Y1. Pin 80 extends along axis Y1 between two extremities 84 and 86, each having a rounded shape in a sectional plane comprising axis Y1 and Z1. Depending on configuration of the injection pump, extremities 84 and 86 may form end stops adapted to abut against extremities of the guiding groove or of another part. On the example of FIGS. 1 to 6, pin 80 is located substantially at half length of surface 18 along axis Y1, between aperture of cavity 19 and aperture of cavity 17.

Preferably, pin 80 is moulded as one single part together with tappet 10. As an alternative, pin 80 may be formed by plastic deformation of tappet 10, for example by punching from inside cavity 17 of tappet 10, with a punch applied to bore 16 and deforming part 11. As another alternative, pin 80 may be machined in the mass of tappet 10.

Tappet 10 includes two annular grooves 181 and 182 centered on axis Y1. Grooves 181 and 182 are open at surface 18. Groove 181 is formed in portion 11, while groove 182 is formed in portion 12. Groove 181 is closer to aperture of cavity 17, while groove 182 is closer to aperture of cavity 19.

Tappet 10 also includes two annular inserts 101 and 102, preferably made of metal. Insert 101 is fitted inside groove 181, while insert 102 is fitted inside groove 182. Tappet 10 is preferably overmolded onto inserts 101 and 102. Thus, inserts 101 and 102 allows to reduce wear of tappet 10 sliding in the non-represented bore.

Figure 7:
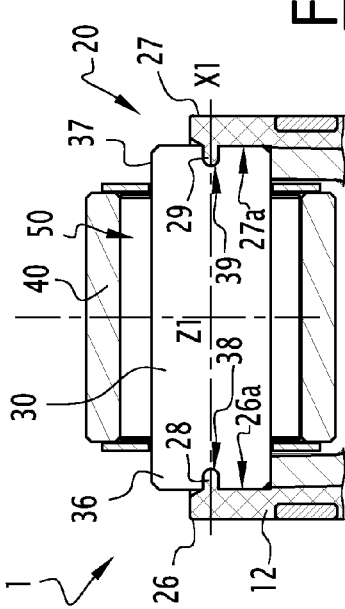
FIG. 7 is a partial sectional view similar to FIG. 4, showing a mechanical system according to a second embodiment of the invention.
Figure 6:
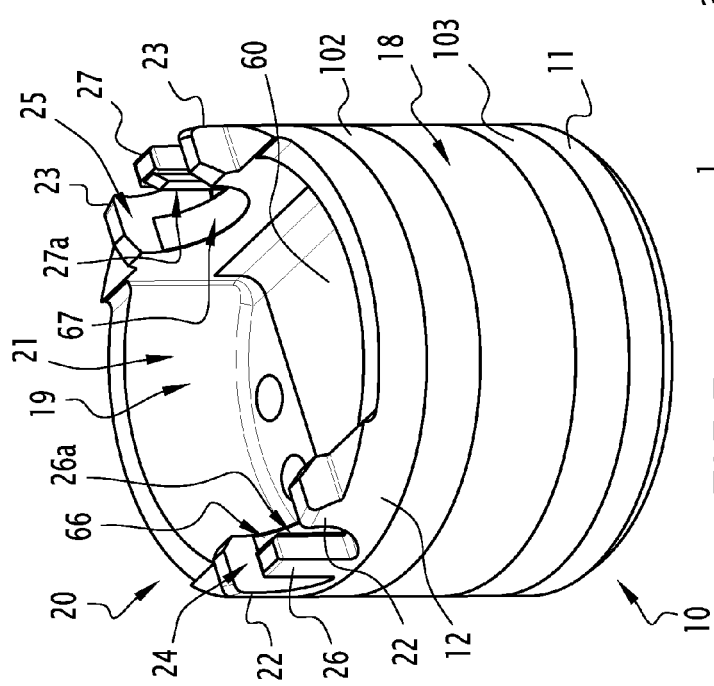
FIG. 6 is a sectional view similar to FIG. 3, showing the tappet of FIG. 5 overmolded onto a bearing insert.

Another embodiment of the invention is represented on FIG. 7. Only the differences with respect to the first embodiment are described hereafter.

On FIG. 7, rib 26 comprises a stub 28 protruding along axis X1 toward rib 27, while rib 27 comprises a stub 29 protruding along axis X1 toward rib 26. A recess 38 is formed inside end 36 along axis X1 by a blind hole, while a recess 39 is formed inside end 37 along axis X1 by a blind hole. Stub 28 is fitted inside recess 38, while stub 29 is fitted inside recess 39. Thus, stubs 28 and 29 ensure radial retention of pin 30 relative to axis X1. Preferably in this case, tappet 10 includes no pairs of tabs 22 and 23. Pin 30 is positioned in bearing contact with sections 24 and 25 formed in bearing portion 20 and with sections 66 and 67 formed in insert 60. Axial retention of pin 30 is ensured by ribs 26 and 27, while radial retention of pin 30 is ensured by stubs 28 and 29, together with sections 24, 25, 66 and 67.

Other non-shown embodiments can be implemented without leaving the scope of the invention. For example, support element 10 and/or roller element 40 may have different configurations, by example depending on the intended application of system 1. According to another example, number, shape and position of device(s) 80 may vary without leaving the scope of the invention.

According to a non-shown embodiment, system 1 may constitute a rocker arm, wherein the support element 10 is not a tappet and wherein the roller element 40 is secured to an arm and a tappet, for example acting on a valve stem.

According to a non-shown embodiment, bearing portion 20 of tappet 10 does not include pairs of tabs 22 and 23. Pin 30 is positioned in bearing contact with partial bores 24 and 25 formed in bearing portion 20 and with sections 66 and 67 formed in insert 60.

According to another non-shown embodiment, system 1 comprises no rolling bearing 50, while pin 30 and roller 40 form together a plain bearing. Indeed, in heavy duty applications such as in diesel truck engines, there is a lack of space and/or excessive loads involved for the implementation of the rolling bearing 50, thus justifying the use of a plain bearing. Alternatively, bearing 50 may be replaced by a bushing.

According to another non-shown embodiment, the pairs of tabs 22 and 23 and/or the ribs 26 and 27 are integrally formed with the insert 60 positioned inside the support element 10.

According to another non-shown embodiment, insert 60 is machined then positioned inside tappet 10.

According to another non-shown embodiment, system 1 comprises an antirotation device 80 which is closer to aperture of cavity 17 than to aperture of cavity 19, or vice versa. In practice, position of the antirotation device 80 depends on position and extent of the guiding groove formed in bore surrounding tappet 10.

According to another non-shown embodiment, the antirotation device 80 may be a bar extending parallel to axis Y1, by example along almost 80% of the length of outer surface 18 of tappet 10, measured parallel to axis Y1. Generally, such a bar extends along at least 50% of the length of outer surface 18.

According to another non-shown embodiment, system 1 comprises two antirotation devices 80. Preferably, the two antirotation devices 80 are aligned parallel to axis Y1, so that they can be positioned in the same groove formed in bore surrounding tappet 10. Alternatively, the two antirotation devices 80 protruding from surface 18 may be diametrically opposed relative to axis Y1.

According to another non-shown embodiment, surface 82 may have a triangular or rectangular shape in a sectional plane perpendicular to axis Y1.

According to another non-shown embodiment, grooves 181 and 182 and inserts 101 and 102 are not annular. In other words, they extend only partly around axis Y1. By example, groove 181 and insert 101 extend around axis Y1 over an angle of 180 degrees on the same side as rib 26, while groove 182 and insert 102 extend around axis Y1 over an angle of 180 degrees on the same side as rib 27.

According to another non-shown embodiment,

Whatever the embodiment, system 1 comprises two ribs 26 and 27 resting on either side of pin ends 36 and 37 for axial retention of pin 30 along axis X1.

In addition, technical features of the different embodiments can be, in whole or part, combined with each other. Thus, the mechanical system 1 and its manufacturing method can be adapted to the specific requirements of the application.

The invention claimed is:

1. A mechanical system, comprising:
    a support element,
    a pin extending along a first axis and comprising two opposite ends, each adapted to be fitted in the support element for radial retention of the pin relative to the first axis;
    a roller element movable in rotation relative to the pin around the first axis; and
    two ribs extending from the support element along a second axis perpendicular to the first axis and resting on either side of the ends for axial retention of the pin along the first axis,
    wherein the two ribs contact the pin in a direction of the first axis, such that the two ribs contact the two outermost opposite ends of the pin, respectively.

2. The mechanical system according to claim 1, wherein the two ribs are integrally formed with the support element.

3. The mechanical system according to claim 1, the support element further comprising two pairs of tabs into which the two opposite ends are clipped for radial retention of the pin relative to the first axis.

4. The mechanical system according to claim 3, wherein the two pairs of tabs are integrally formed with the support element.

5. The mechanical system according to claim 1, the support element further comprising two bearing sections receiving at least partially both ends of the pin.

6. The mechanical system according to claim 1, wherein each rib includes a stub protruding toward the other stub along the first axis, while each end of the pin includes a recess for receiving one of the stubs, for radial retention of the pin relative to the first axis.

7. The mechanical system according to claim 1, wherein the support element is overmolded onto an insert receiving at least partially both ends of the pin.

8. The mechanical system according to claim 1, further comprising at least one antirotation device integrally formed with the support element.

9. The mechanical system according to claim 1, further comprising:
a rolling bearing including rolls or needles or a bushing positioned between the pin and the roller element; and
lateral flanges for axial retention of the rolls or needles or of the bushing along the first axis.

10. The mechanical system according to claim 1, wherein the support element is made of a synthetic material.

11. The mechanical system according to claim 1, wherein the support element is made of one of polyamide or polyether-ether-ketone.

12. The mechanical system according to claim 1, wherein it constitutes a cam follower, wherein the support element is a tappet movable along a translation axis perpendicular to the first axis and wherein the roller element is adapted to roll on an outer surface of a cam.

13. The mechanical system according to claim 1, wherein it constitutes a rocker arm, wherein the roller element is secured to an arm and a tappet, possibly acting on a valve stem.

14. An injection pump for a motor vehicle comprising:
a mechanical system, including:
a support element,
a pin extending along a first axis and comprising two opposite ends, each adapted to be fitted in the support element for radial retention of the pin relative to the first axis, and
a roller element movable in rotation relative to the pin around the first axis,
wherein the mechanical system comprises two ribs extending from the support element along a second axis perpendicular to the first axis and resting on either side of the ends for axial retention of the pin along the first axis,
wherein the mechanical system is a subassembly integrated into the injection pump,
wherein the two ribs contact the pin in a direction of the first axis, such that the two ribs contact the two outermost opposite ends of the pin, respectively.

15. A valve actuator for a motor vehicle comprising:
a mechanical system, including:
a support element,
a pin extending along a first axis and comprising two opposite ends, each adapted to be fitted in the support element for radial retention of the pin relative to the first axis, and
a roller element movable in rotation relative to the pin around the first axis,
wherein the mechanical system comprises two ribs extending from the support element along a second axis perpendicular to the first axis and resting on either side of the ends for axial retention of the pin along the first axis,
wherein the mechanical system is a subassembly integrated into the valve actuator,
wherein the two ribs contact the pin in a direction of the first axis, such that the two ribs contact the two outermost opposite ends of the pin, respectively.

16. A method for manufacturing a mechanical system comprising steps of:
obtaining components of the mechanical system, the components including:
a support element comprising two pairs of tabs,
a pin extending along a first axis and comprising two opposite ends, each adapted to be fitted in the support element for radial retention of the pin relative to the first axis;
a roller element; and
two ribs extending from the support element along a second axis perpendicular to the first axis and resting on either side of the ends for axial retention of the pin along the first axis, wherein the two ribs contact the pin in a direction of the first axis, such that the two ribs contact the two outermost opposite ends of the pin, respectively;
assembling the roller element to be movable in rotation relative to the pin around the first axis; and
clipping the two opposite ends of the two pairs of tabs for radial retention of the pin relative to the first axis; and
inserting the pin into the clipped ends of the pairs of tabs and between the two ribs within the support element.

\* \* \* \* \*